March 17, 1936.                L. RICEFIELD                2,034,000
COUPLING
Filed Aug. 11, 1934                2 Sheets-Sheet 2
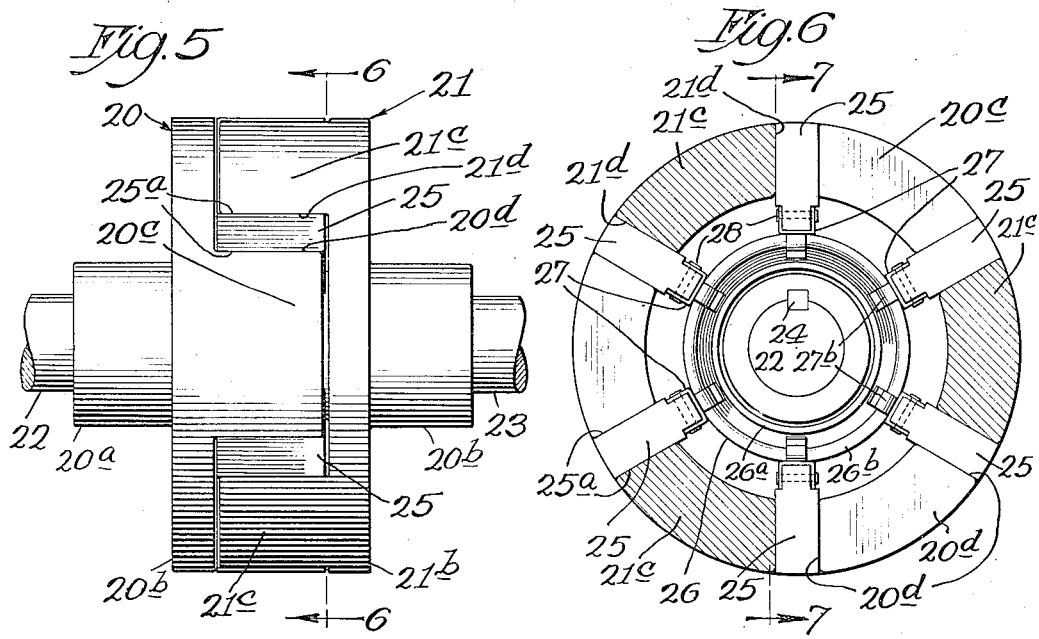
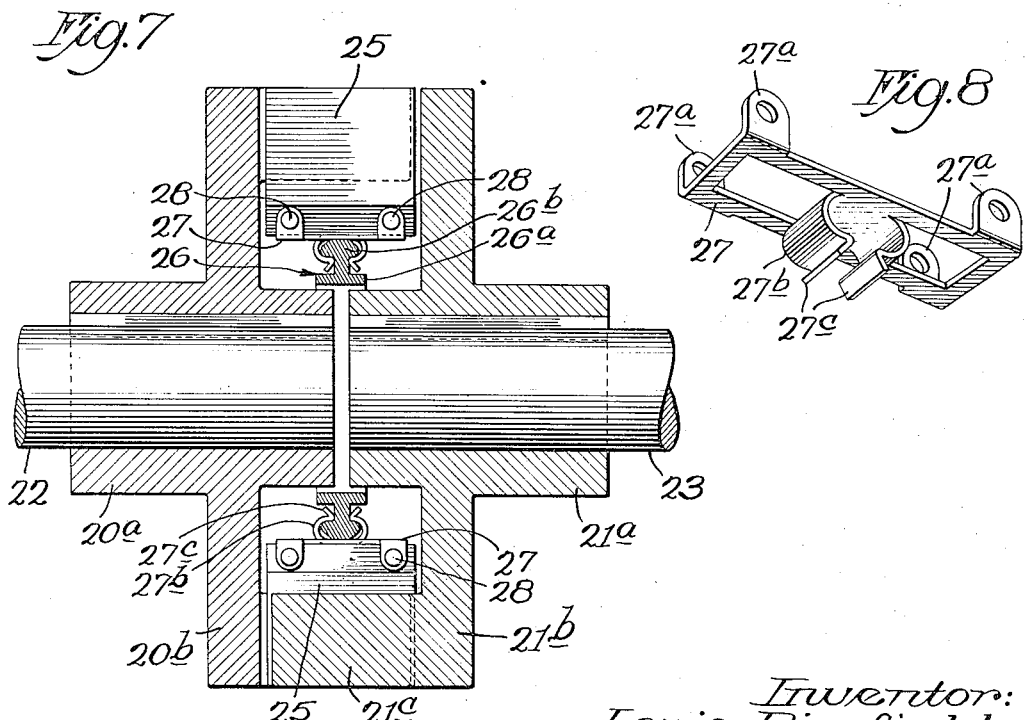
Inventor:
Louis Ricefield
By Rector, Hibben, Davis & Macauley
Attys.

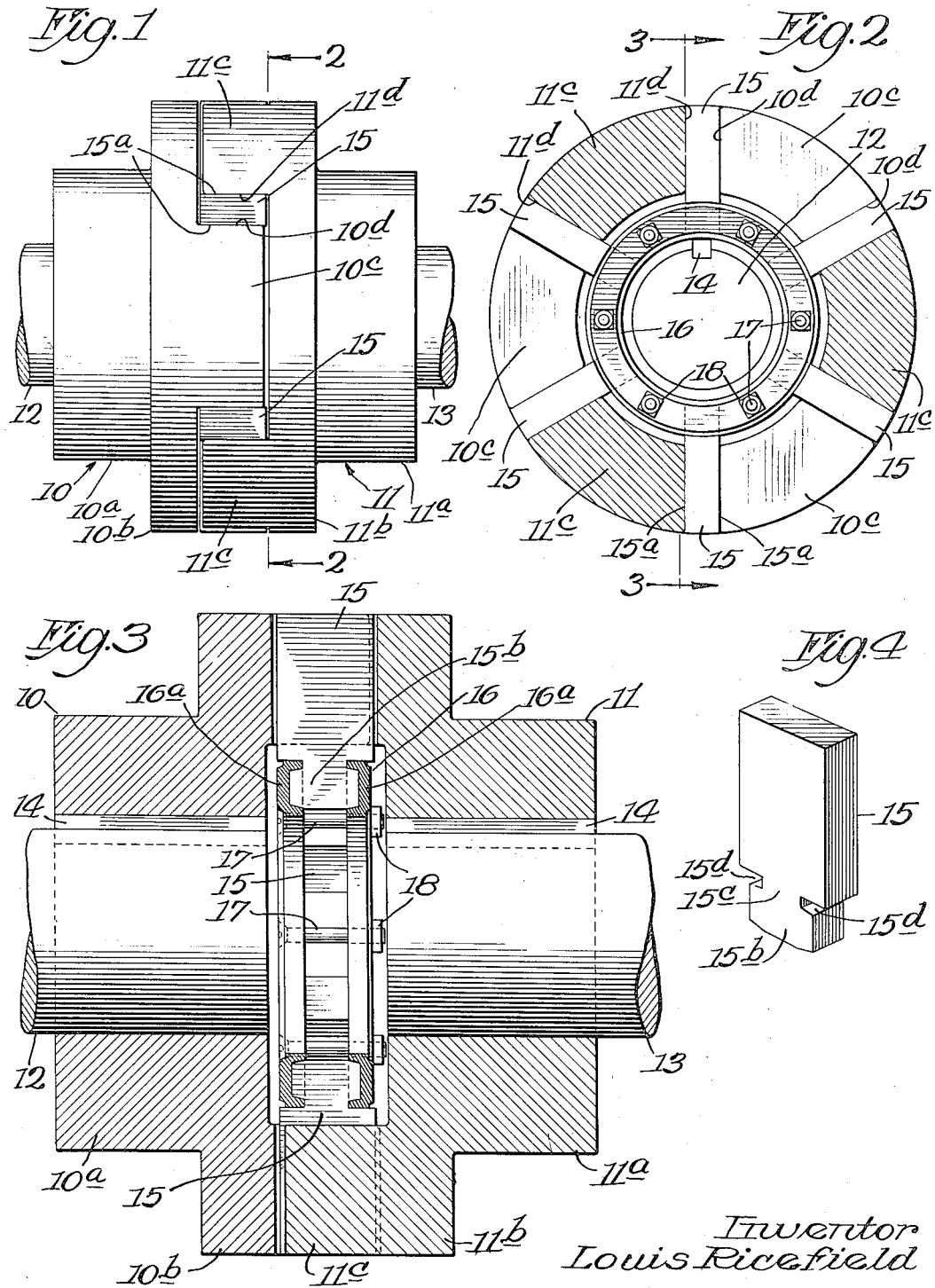

Patented Mar. 17, 1936

2,034,000

UNITED STATES PATENT OFFICE 2,034,000

COUPLING

Louis Ricefield, Oak Park, Ill.

Application August 11, 1934, Serial No. 739,420

11 Claims. (Cl. 64—14)

This invention relates to improvements in flexible couplings for connecting substantially aligned shafts and its purpose is to provide an improved device adapted to compensate for angular misalignment of the connected shafts, relative lateral displacement thereof, and also for relative end play of the shafts during their rotation. The present invention is an improvement upon a type of flexible shaft coupling now in general use in which a pair of coupling members secured to the substantially aligned shafts are each provided with longitudinally extending lugs or jaws which intermesh loosely with each other and which coact directly with the faces of intervening power transmitting members which are carried by a common supporting member, such as a hub, thus forming an intervening spider, located between the coupling members. With couplings of the type referred to, it has been necessary, in the case of wear or injury to one or more arms of the power transmitting spider, to replace the entire spider, because of its integral construction, and the principal object of the present invention is to provide an improved coupling in which the power transmitting member is interposed between the lugs or jaws of two coupling members secured upon the substantially aligned shafts, are detachably carried by a common supporting member so that they may be independently removed and replaced as desired. A further object of the invention is to provide an improved flexible power transmitting coupling comprising a pair of complementary coupling members each adapted to be secured upon one of the substantially aligned shafts and each having a plurality of lugs or jaws extending longitudinally therefrom to intermesh loosely with the lugs or jaws of the other coupling member, these lugs or jaws on opposite coupling members having opposed faces adapted to contact with intervening power transmitting members which are detachably carried by an annular supporting member, mounted, preferably, in a floating position in a plane between the body portions of the coupling members. Still another object of the invention is to provide an improved flexible power transmitting coupling for connecting substantially aligned shafts comprising a pair of complementary coupling members each adapted to be secured upon one of said shafts and each having a plurality of lugs or jaws intermeshing loosely with the lugs or jaws of the other member and a plurality of power transmitting members each opposed between faces of two of said lugs or jaws carried by opposite coupling members and each detachably mounted upon a supporting ring or the like from which it may be removed independently of the other power transmitting members and without disturbing the normal positions of said coupling members on said shafts. A further object of the invention is to provide an improved flexible coupling for connecting substantially aligned shafts comprising a pair of coupling members having interposed between them a power transmitting member comprising an annular ring to which a series of power transmitting members are detachably secured by resilient clips or the like. Other objects of the invention relate to various features of construction and arrangement which will appear more fully hereinafter.

The nature of the invention will be understood from the following specification taken with the accompanying drawings in which two embodiments are illustrated.

In the drawings,—

Figure 1 shows a side elevation of an improved shaft coupling embodying the features of the present invention.

Fig. 2 shows a radial section taken on the line 2—2 of Fig. 1.

Fig. 3 shows an enlarged section taken on the line 3—3 of Fig. 2.

Fig. 4 is a perspective view of one of the power transmitting members embodied in the construction illustrated in Figs. 1, 2 and 3.

Fig. 5 shows a side elevation of a modified form of the invention.

Fig. 6 shows a transverse section taken on the line 6—6 of Fig. 5.

Fig. 7 shows an enlarged section taken on the line 7—7 of Fig. 6; and

Fig. 8 is a perspective view of one of the spring clips by which the power transmitting members are detachably secured upon the supporting rings.

In the form of the invention shown in Figs. 1, 2, 3 and 4, the improved coupling comprises a pair of complementary coupling members 10 and 11 which are secured upon a pair of substantially aligned shafts 12 and 13, respectively. The coupling members are held against rotation upon the shafts by means of keys 14 and may also be secured against longitudinal movement on the shafts by set screws or the like. The coupling members comprise hub portions $10^a$ and $11^a$ having formed integrally therewith a pair of radiating disks $10^b$ and $11^b$, respectively. The disk $10^b$ has formed integrally therewith a plurality of longitudinally extending lugs or jaws $10^c$ which are arranged to intermesh loosely with a plurality of similar lugs or jaws 11c which are formed on the other coupling member 11. Each lug or jaw 10c has a pair of opposite power transmitting faces 10d each of which is parallel to the corresponding face 11d formed upon one of the lugs or jaws 11c carried by the other coupling member. In the embodiment illustrated, the opposed faces 10b and 11b are parallel to each other and are also parallel to a plane midway between them and containing the axis of the connected shafts, but the arrangement of these faces may be altered without departing from the spirit of the present invention which relates primarily to the arrangement and mounting of the intervening power transmitting members 15, each of which has a pair of opposite faces 15a adapted to contact with the faces 10d and 11d of two adjacent lugs or jaws. These power transmitting members 15 may have the form illustrated in Fig. 4, where each is shown as being constructed substantially as a rectangular block of rubber, rubber composition, leather or other resilient material, provided at its inner end with a projecting portion 15b of lesser width than the body portion of the block from which it is separated by a connecting neck 15c on the opposite sides of which are located the grooves 15d. These power transmitting members 15 are carried by an annular supporting member 16 which is illustrated as taking the form of a hub mounted between the two coupling members 10 and 11 and comprising a pair of complementary metallic channel members 16a. These channel members have their flanges directed inwardly toward each other and they are connected together by a series of bolts 17 and nuts 18 so that the innermost flanges of these circular channel members are secured firmly in engagement with the grooves 15d of the power transmitting blocks and the projections 15b are clamped securely within the channels of the members 16a. There is thus formed a power transmitting spider having a metallic supporting ring or hub to which the resilient power transmitting members 15 are detachably secured. In case of excessive wear of one of these members 15 or in the event of injury thereto, either of the coupling members 10 or 11 may be moved longitudinally of its supporting shaft and access may thereby be gained to the intervening spider so that, upon loosening the nut 18, the channel-shaped ring 16a may be separated and the defective power transmitting member may be removed and replaced by another. In this way a unitary power transmitting spider is provided having the characteristics in use of the integral power transmitting spiders heretofore used, but having the advantage that worn or defective parts thereof may be replaced without the trouble or expense of replacing the entire spider.

In Figs. 5, 6, 7 and 8 of the drawings, there is illustrated another form of the invention in which the power transmitting members are detachably secured upon a supporting ring or the like so that any one of them may be independently removed without the necessity of disturbing any of the others and without requiring the movement of either coupling member longitudinally of its supporting shaft. In this embodiment a pair of complementary coupling members 20 and 21 are secured upon a pair of substantially aligned shafts 22 and 23, respectively, by means of keys 24. Set screws may also be employed for preventing relative movement of the coupling members longitudinally of the shafts. The coupling members 20 and 21 comprise hub portions 20a and 21a, respectively, which are secured upon the shafts and also radiating disks 20b and 21b, respectively. The coupling member 20 carries a plurality of longitudinally extending lugs or jaws 20c which intermesh loosely with a plurality of similar lugs or jaws 21c which are carried by the other coupling member 21 and these lugs or jaws are adapted to coact with a plurality of intervening power transmitting members 25 which are constructed in the form of substantially rectangular blocks of rubber, rubber composition, or other resilient material. In the embodiment illustrated, the power transmitting members 25 have opposed parallel faces 25a which are also parallel to planes passing midway between them and containing the axes of the shafts, but other arrangements of these lug engaging faces may be employed if desired. The power transmitting members 25 are engaged on their faces 25a by the surfaces 20d and 21d of the power transmitting lugs or jaws 20c and 21c, respectively.

In order to retain the power transmitting members 25 in their proper positions between the disks 20b and 21b of the coupling members and to prevent radial outward movement thereof under the influence of centrifugal force during the rotation of the shaft, these power transmitting members 25 are carried by a supporting member 26 which is constructed preferably in the form of an annular ring mounted to float between the disks of the coupling members and out of contact with the inwardly extending portions of the hubs of these coupling members, as clearly shown in Fig. 7. The supporting or retaining ring 26 is constructed with an inner flange 26a surrounding portions of the hubs of the coupling members, in an outer annular head 26b, similar to the head of a railway rail, which is adapted to form a detachable interlocking engagement with a series of metal brackets 27, each of which series is secured to one of the power transmitting members 25. As shown in Fig. 8, each bracket 27 comprises a rectangular frame having projecting ears 27a which embrace opposite sides of a power transmitting member 25 and which are apertured to receive rivets 28 passing therethrough and through the power transmitting members to hold the parts in assembled relation. Each bracket 27 carries a pair of spring clips 27b which are shaped to conform to the head 26b of the supporting ring and which are provided at their extremities with diverging flanges 27c which, when brought into engagement with the curved outer surface of the head of the supporting rings to permit the spring clips to be spread apart until they snap into engagement with the ring. When one of the power transmitting members becomes defective, the outer end thereof may be engaged and it may be removed and replaced without disturbing any of the other power transmitting members and without separating the coupling members from each other. Instead of mounting the supporting member 26 in a freely floating position as shown in the drawings, it may be formed as an integral part of or attached to the hub of one of the coupling members.

Although two forms of the invention have been shown and described by way of illustration, it will be understood that the invention may be constructed in various other embodiments coming within the scope of the appended claims.

I claim:

1. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling members, a plurality of power transmitting members each interposed between two of said jaws carried by opposite coupling members and each recessed on opposite sides at one end thereof, and a retaining member upon which said power transmitting members are detachably mounted by means engaging said recessed portions thereof.

2. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling members, a plurality of power transmitting members of resilient material each interposed between two of said jaws carried by opposite coupling members and each recessed on opposite sides thereof, and a hub mounted between said coupling members and having the inner recessed parts of said power transmitting members detachably secured thereto.

3. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling members, a plurality of power transmitting members each interposed between two of said jaws carried by opposite coupling members, said power transmitting members having grooves in their opposite sides at their inner ends, and retaining members clamped together and having flanges engaging said grooves to hold said power transmitting members in position.

4. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling members, a plurality of power transmitting members each interposed between two of said jaws carried by opposite coupling members, said power transmitting members being provided at their inner ends with heads connected to the body portions thereof by parts of reduced size, a pair of annular retaining members of channel form having their flanges directed toward each other to embrace said heads, and means for clamping said retaining members together.

5. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling members, a plurality of power transmitting members each interposed between two of said jaws carried by opposite coupling members, an annular retaining member and means carried by said power transmitting members for detachably engaging said retaining member.

6. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling members, a plurality of power transmitting members each interposed between two of said jaws carried by opposite coupling members, an annular retaining ring mounted between said coupling member, and means carried by said power transmitting members for detachably engaging said retaining ring.

7. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling members, a plurality of power transmitting members each interposed between two of said jaws carried by opposite coupling members, an annular retaining ring mounted between said coupling members, and spring clips carried by said power transmitting members and adapted to form a detachable interlocking engagement with said retaining ring.

8. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling members, a plurality of power transmitting members each interposed between two of said jaws carried by opposite coupling members, an annular retaining ring mounted between said coupling members and having an enlarged annular head, and brackets secured to said power transmitting members and having spring clips adapted to form detachable engagements with said heads.

9. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling members, a plurality of power transmitting members each interposed between two of said jaws carried by opposite coupling members, an annular retaining ring mounted between said coupling members and having an enlarged annular head, and brackets secured to said power transmitting members and having spring clips adapted to form detachable engagements with said heads, said spring clips having diverging flanges adapted to cause said clips to spread apart when said power transmitting members are thrust radially inward.

10. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling members, a plurality of power transmitting members each interposed between two of said jaws carried by opposite coupling members, said coupling members having hub portions extending inwardly opposite the inner ends of said power transmitting members, an annular retaining ring mounted in floating position around said hub portions, and spring clips carried by said power transmitting members and having detachable engagement with said retaining ring.

11. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling members, a plurality of resilient power transmitting members each interposed between two of said jaws carried by opposite coupling members, and a pair of members detachably clamping end portions of said power transmitting members between them beyond the areas of contact of said members with said jaws.

LOUIS RICEFIELD.